J. A. SVEDBERG.
WATER-MOTORS FOR LIGHT MACHINERY.
No. 184,558. Patented Nov. 21, 1876.
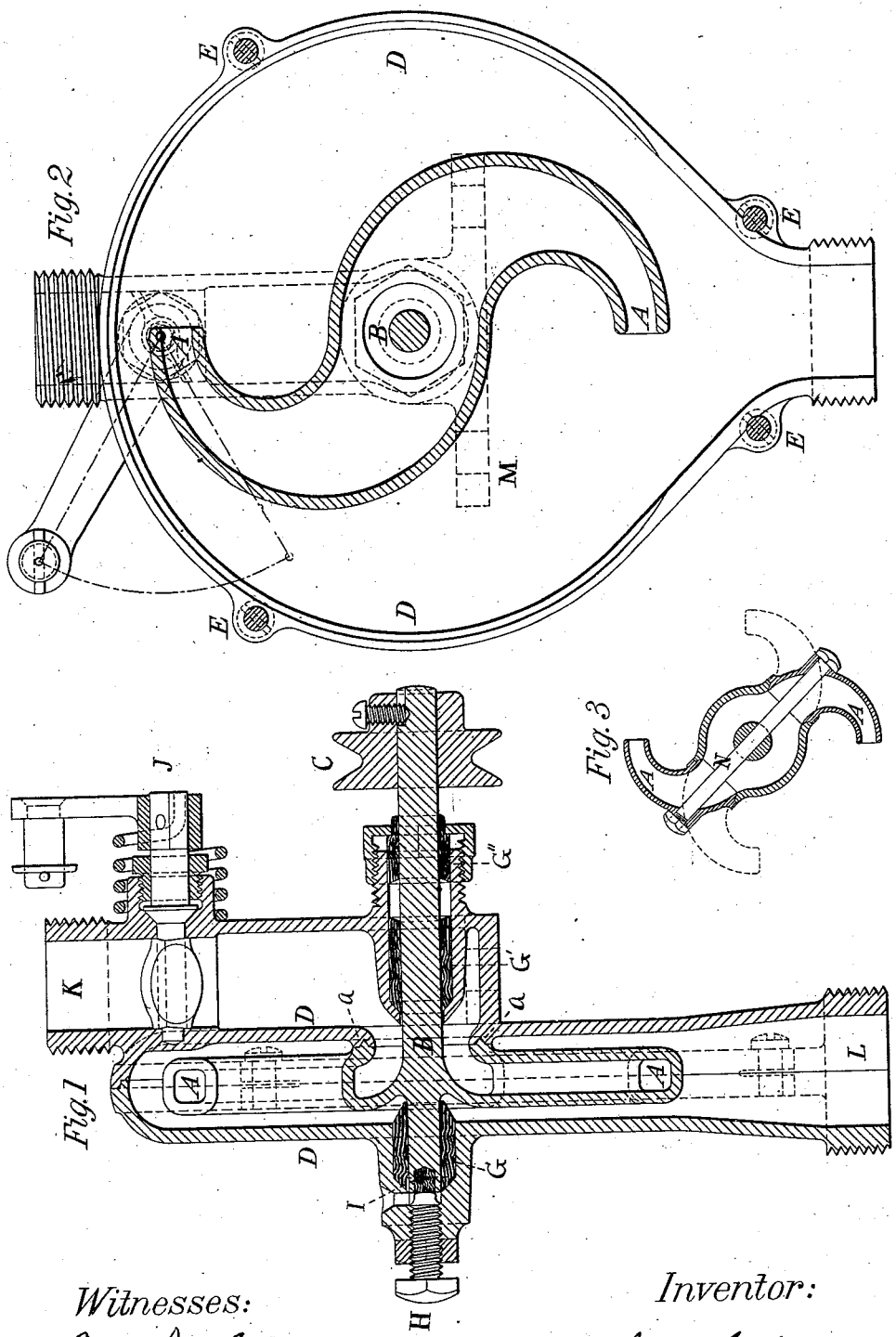
Witnesses:
Inventor:
John A. Svedberg

UNITED STATES PATENT OFFICE.

JOHN A. SVEDBERG, OF WASHINGTON, DISTRICT OF COLUMBIA, ASSIGNOR OF ONE-HALF HIS RIGHT TO JOHN W. MOORE, OF SAME PLACE.

IMPROVEMENT IN WATER-MOTORS FOR LIGHT MACHINERY.

Specification forming part of Letters Patent No. 184,558, dated November 21, 1876; application filed October 13, 1876.

*To all whom it may concern:*

Be it known that I, JOHN A. SVEDBERG, of Washington, in the District of Columbia, have invented certain new and useful Improvements in Water-Motors for Light Machinery; and I do hereby declare that the following is a full, clear, and exact description thereof, which will enable others skilled in the art to which it appertains to make and use the same, reference being had to the accompanying drawings, and to letters of reference marked thereon, which form a part of this specification.

The object of this invention is to furnish a turbine water-wheel of such construction, so few parts, and so cheaply made that all light machinery now in common use in the household may be economically operated thereby in all places having a water-supply, and it is especially adapted to the running of sewing-machines.

In the drawing, Figure 2 is a front section, and Fig. 1 a transverse section, of my invention. Fig. 3 shows a turbine-wheel with adjustable arms.

A is a turbine-wheel of cast metal, receiving the water in the center and discharging it from two openings in opposite arms, and revolving with the stem or spindle B, running in lignum-vitæ bearings G, G', and G''. A piece of lignum-vitæ, I, is inserted in the end of the spindle B, against which bears the set-screw H, which receives the thrust of the wheel, and also provides for compensation in wear. A V-shaped face at $a$ and $a$ prevents the passage and waste of water between the revolving wheel and the case D. The case D is cast in two parts, which, after being fitted, are bolted together at E E E E. A flange, M, allows the case to be secured when the machine is to work.

The speed, pressure, and amount of water admitted are regulated by the valve J. The spindle of this valve passes through a stuffing-box to prevent any waste of water, and has coiled around it a spring, which keeps it always closed, except when, at the will of the operator, it is more or less open. A short crank is fitted to the end of the valve-spindle, from which a cord may pass to the treadle of a sewing-machine, or directly to the foot of the operator, so that the valve may be worked by the feet, and the hands left at liberty.

At the inlet K and outlet L sections of hose may be attached to supply and carry off the water, or the motor may be permanently fixed to the water-works. Upon the outer end of the spindle B a pulley, C, is fixed, by which the motion is carried by a belt to any machinery.

Between the lignum-vitæ bearings G' and G'' a space is left for the insertion of suitable packing to prevent any escape of water around the spindle.

Fig. 3 shows a form of the wheel having the extremities of the arms A A cast separately, and held in place upon the hub by the rod N, passing through and connecting them. This arrangement allows the arms to be reversed, so as to cause the wheel to revolve either toward the right or the left, to adapt it to machinery turning in either direction, and saving the friction caused by crossing the belt, which, with a light head or pressure of water, is an advantage, since it saves any waste or loss of power.

I am aware that many forms of turbine water-wheels are in common use; but I do not believe that any yet known is so simple, cheap, and so well adapted to the use for which this one is intended has yet been devised; and

What I claim as new, and desire to secure by Letters Patent, is—

1. In a turbine water-wheel, the reversible arms A A, fitted upon the hub or central part of the wheel, and held in place by the rod N, passing through them and the hub.

2. In a turbine water-motor for light machinery, the combination of the wheel A with fixed or reversible arms, and the case D, constructed of two parts, having an inlet, K, outlet L, and valve J, substantially as herein described.

In testimony that I claim the foregoing as my own I affix my signature in presence of two witnesses.

JOHN A. SVEDBERG.

Witnesses:
 A. G. HEYLMAN,
 J. TYLER POWELL.